(12) United States Patent
Xu et al.

(10) Patent No.: US 9,473,471 B2
(45) Date of Patent: Oct. 18, 2016

(54) METHOD, APPARATUS AND SYSTEM FOR PERFORMING PROXY TRANSFORMATION

(71) Applicant: HUAWEI TECHNOLOGIES CO., LTD., Shenzhen, Guangdong (CN)

(72) Inventors: Lei Xu, Beijing (CN); Xiaoxin Wu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 222 days.

(21) Appl. No.: 14/145,046

(22) Filed: Dec. 31, 2013

(65) Prior Publication Data

US 2014/0115322 A1    Apr. 24, 2014

Related U.S. Application Data

(63) Continuation of application No. PCT/CN2012/082005, filed on Sep. 26, 2012.

(30) Foreign Application Priority Data

May 2, 2012 (CN) .......................... 2012 1 0133564

(51) Int. Cl.
| | |
|---|---|
| *H04L 29/06* | (2006.01) |
| *H04L 29/08* | (2006.01) |
| *H04L 9/30* | (2006.01) |

(52) U.S. Cl.
CPC ......... *H04L 63/0471* (2013.01); *H04L 9/3073* (2013.01); *H04L 63/0281* (2013.01);
(Continued)

(58) Field of Classification Search
CPC ........... H04L 2209/76; H04L 63/0428; H04L 63/0471; H04L 63/0281; H04L 67/06; H04L 67/2823; H04L 67/306; H04L 9/3073; H04L 9/14
USPC ........................................................ 713/153
See application file for complete search history.

(56) References Cited

U.S. PATENT DOCUMENTS

| | | |
|---|---|---|
| 6,859,533 B1 * | 2/2005 | Wang ........................ H04L 9/14 380/259 |
| 6,963,972 B1 | 11/2005 | Chang et al. |

(Continued)

FOREIGN PATENT DOCUMENTS

| | | |
|---|---|---|
| CN | 1466839 | 1/2004 |
| CN | 101051901 | 10/2007 |

(Continued)

OTHER PUBLICATIONS

Extended European Search Report, dated Jul. 2, 2014, in corresponding European Application No. 12870325.3 (7 pp.).

(Continued)

*Primary Examiner* — Yogesh Paliwal
(74) *Attorney, Agent, or Firm* — Staas & Halsey LLP

(57) ABSTRACT

A method for performing proxy transformation between a user and a server includes: selecting a first proxy relationship between a target user and a first user from a proxy relationship library; selecting a random value, and generating a second proxy relationship according to the random value and the first proxy relationship; and encrypting original information according to the public key of the first user and the random value to obtain the encrypted information, and transmitting the encrypted information and the second proxy relationship to the server, so that the server performs proxy transformation on the encrypted information according to the second proxy relationship to obtain the transformed information. The method for performing proxy transformation thoroughly solves the security hazard that the server performs proxy transformation without user permission. The present invention further discloses a user terminal and a system for performing proxy transformation.

10 Claims, 3 Drawing Sheets

(52) U.S. Cl.
CPC .......... *H04L63/0428* (2013.01); *H04L 67/06* (2013.01); *H04L 67/2823* (2013.01); *H04L 67/306* (2013.01); *H04L 2209/76* (2013.01)

(56) References Cited

U.S. PATENT DOCUMENTS

| | | | | |
|---|---|---|---|---|
| 2008/0059787 | A1* | 3/2008 | Hohenberger | ........ H04L 9/3013 713/153 |
| 2008/0126801 | A1 | 5/2008 | Lee et al. | |
| 2010/0260338 | A1 | 10/2010 | Haddad et al. | |

FOREIGN PATENT DOCUMENTS

| | | |
|---|---|---|
| CN | 101192261 | 6/2008 |
| CN | 101710879 | 5/2010 |
| CN | 102111269 | 6/2011 |
| CN | 102404121 | 4/2012 |
| EP | 2704352 | 3/2014 |

OTHER PUBLICATIONS

International Search Report and Written Opinion, dated Feb. 7, 2013, in corresponding International Application No. PCT/CN2012/082005 (11 pp.).

Office Action mailed Oct. 9, 2015 in Chinese Patent Application No. 201210133564.3.

Office Action mailed Sep. 24, 2015 in Chinese Patent Application No. 2012101335643.

* cited by examiner

METHOD, APPARATUS AND SYSTEM FOR PERFORMING PROXY TRANSFORMATION

CROSS-REFERENCE TO RELATED APPLICATIONS

This application is a continuation of International Application No. PCT/CN2012/082005, filed on Sep. 26, 2012, which claims priority to Chinese Patent Application No. 201210133564.3, filed on May 2, 2012, both of which are hereby incorporated by reference in their entireties.

FIELD OF THE INVENTION

Embodiments of the present invention relate to the field of communications technologies, and in particular, to a method, an apparatus and a system for performing proxy transformation.

BACKGROUND OF THE INVENTION

A proxy transformation technology is a technology of transforming a ciphertext without leaking ciphertext information. Specifically, assume that there are two users A and B, where the public key of the user A is $pk_A$, and the private key of the user A is $sk_A$; and the public key of the user B is $pk_B$, and the private key of the user B is $sk_B$. Using public/private key information of the users A and B may calculate a proxy relationship $rk_{AB}$. The relationship is generally sent by the user A to a server S after the user A has calculated the relationship. When the server S acquires the proxy relationship $rk_{AB}$, the server S may use $rk_{AB}$ to transform a message encrypted by $pk_A$ into a message encrypted by $pk_B$. In the transforming process, the server S cannot see the plaintext of the message. After the transformation is completed, the user B may use the individual private key to decrypt the message and obtain the plaintext of the message. The technology has the following problem: if the server S acquires the proxy relationship $rk_{AB}$ from the user A to the user B and a proxy relationship $rk_{AC}$ from the user A to a user C at the same time and the server S is controlled by a malicious user, when the user A uses the individual public key $pk_A$ to encrypt a message and only hopes that the user B receives the message, the server S controlled by the malicious user may use the acquired proxy relationship $rk_{AC}$ to perform transformation, which enables the user C to obtain the message. The existing technical solution for solving the problem includes: using several servers to enhance security. Specifically, the user A calculates the proxy relationship with the user B, and divides the relationship into n parts, which are recorded as $rk1_{AB}$, $rk2_{AB}$, ..., $rkn_{AB}$, and delivered to n servers, respectively. The user A uses the individual public key $pk_A$ to encrypt and send a message to the n servers, and the $i^{th}$ server uses the proxy relationship $rki_{AB}$ to perform proxy transformation on the message and send the message to the user B. After the user B obtains transformation results of all the n servers, the user B may integrate all the results to obtain the message encrypted by using the public key $pk_B$ of the user B. Then, the user B may use the individual private key $sk_B$ to decrypt the message. In the solution, the problem of "performing transformation without unauthorization of a user" is not entirely solved. The reason is that, although n servers are used, the malicious user may still control all the n servers to complete transformation without unauthorization, thereby causing information leakage. There is another technical solution that also needs to use several servers. The user B does not need to obtain transformation results from all the n servers, and only needs to obtain transformation results from any k (k≤n) servers and integrate the results to obtain the message encrypted by using the public key $pk_B$ of the user B. After that, the user B may use the individual private key $sk_B$ to decrypt the message. The technical solution does not solve the problem of "performing transformation without unauthorization of a user". When the malicious user controls greater than or equal to K servers, unauthorized transformation may be performed, thereby causing information leakage.

SUMMARY OF THE INVENTION

Embodiments of the present invention provide a method, a user terminal and a system for performing proxy transformation, which are used to eliminate a security hazard of performing proxy transformation without user permission and guarantee security of information transmitted by a user.

An embodiment of the preset invention provides a method for performing proxy transformation, including:

selecting a first proxy relationship between a target user and a first user from a proxy relationship library;

selecting a random value, and generating a second proxy relationship according to the random value and the first proxy relationship; and encrypting original information according to the public key of the first user and the random value to obtain the encrypted information, and transmitting the encrypted information and the second proxy relationship to a server, so that the server performs proxy transformation on the encrypted information according to the second proxy relationship to obtain the transformed information.

An embodiment of the present invention further provides a user terminal for performing proxy transformation, including: a randomized relationship generating module, configured to select a first proxy relationship between the user terminal and a target user terminal from a proxy relationship library, and generate a second proxy relationship according to a random value and the first proxy relationship; an encryption module, configured to encrypt original information according to the random value obtained by the randomized relationship generating module and the public key of a first user terminal to obtain the encrypted information; and a first transmission module, configured to transmit the encrypted information obtained by the encryption module and the second proxy relationship obtained by the randomized relationship generating module.

An embodiment of the present invention further provides a communication system for performing proxy transformation, including: at least one user terminal, configured to establish proxy relationships between the user terminal and other user terminals at a first user terminal, and generate a proxy relationship library according to the proxy relationships; and a server, where the first user terminal selects a first proxy relationship between a target user terminal and the first user terminal from the proxy relationship library, then selects a random value, and generates a second proxy relationship according to the random value and the first proxy relationship; the first user terminal encrypts original information according to the public key of the first user terminal and the random value to obtain the encrypted information, and transmits the encrypted information and the second proxy relationship to the server; the server performs proxy transformation on the encrypted information according to the second proxy relationship to obtain the transformed information, and transmits the transformed information to the target user terminal; and the target user terminal decrypts the transformed information to obtain the original information.

In the communication method, the user terminal and the system for performing proxy transformation according to the embodiments of the present invention, a technical solution is adopted that a data owner generates a proxy key and saves the key locally, and when sharing data, randomizes the proxy key and sends the randomized key to a proxy server; the proxy server uses the randomized key to complete proxy re-encryption; and a sharer decrypts a result re-encrypted by using the randomized proxy key. Therefore, the security hazard that the server performs proxy transformation without user permission is eliminated, the security is enhanced, and the security of data transmission is effectively protected.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF THE EMBODIMENTS

The following clearly and describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
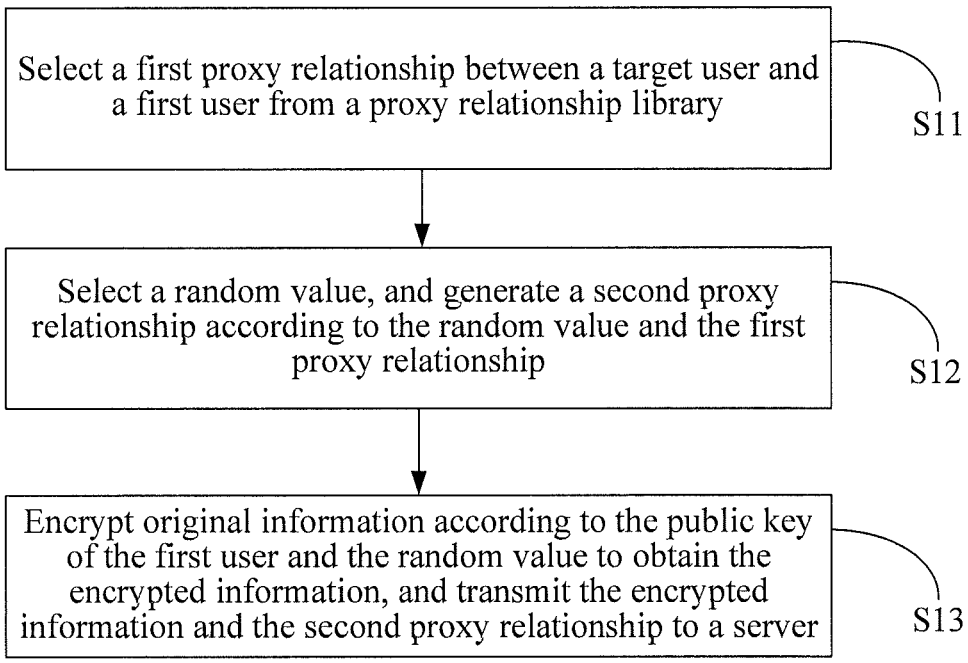
FIG. 1 is a flow chart of a communication method for performing proxy transformation between a user and a server according to an embodiment of the present invention.

As shown in FIG. 1, a method for performing proxy transformation according to an embodiment of the present invention includes:

S11: Select a first proxy relationship between a target user and a first user from a proxy relationship library.

S12: Select a random value, and generate a second proxy relationship according to the random value and the first proxy relationship.

S13: Encrypt original information according to the public key of the first user and the random value to obtain the encrypted information, and transmit the encrypted information and the second proxy relationship to a server, so that the server performs proxy transformation on the encrypted information according to the second proxy relationship to obtain the transformed information.

In a communication method for performing proxy transformation according to an embodiment of the present invention, a data owner generates a proxy key and saves the key locally, and when sharing data, randomizes the proxy key and sends the randomized key to a proxy server; the proxy server uses the randomized key to complete proxy re-encryption; and a receiver decrypts information re-encrypted by using the randomized proxy key. Therefore, the security hazard that the server performs proxy transformation without user permission is eliminated, the security is enhanced, and the security of data transmission is effectively protected.

Figure 2:
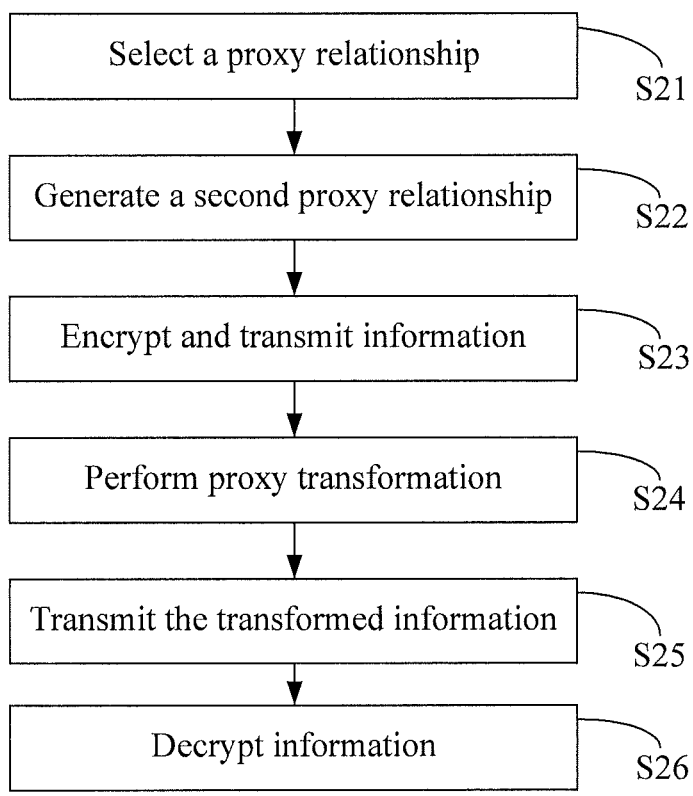
FIG. 2 is a flow chart of a communication method for performing proxy transformation between a user and a server according to an embodiment of the present invention.

As shown in FIG. 2, an embodiment of the preset invention provides a method for performing proxy transformation, including:

S21: Select a proxy relationship.

A first proxy relationship between a target user and a first user is selected from a proxy relationship library.

In an embodiment of the present invention, the proxy relationship library may be pre-stored at the first user or generated at the first user when this method is implemented.

In an embodiment of the present invention, the first proxy relationship is calculated according to the private key of the first user and the public key of the target user. For example, the proxy relationship between a user A and a target user B is $rk_{AB}$, where the public key of the user A is $pk_A$, and the private key of the user A is $sk_A$; and the public key of the user B is $pk_B$, and the private key of the user B is $sk_B$. A proxy relationship $rk_{AB}$ may be calculated by using the public/private key information of the users A and B.

S22: Generate a second proxy relationship.

A random value is selected, and a second proxy relationship is generated according to the random value and the first proxy relationship.

In an embodiment of the present invention, the random value is selected by the user A or randomly generated at the user A.

In an embodiment of the present invention, the user A selects a random number r, and uses the random number to randomize the first proxy relationship $rk_{AB}$ to obtain a corresponding second proxy relationship $rk_{AB}^r$.

S23: Encrypt and transmit information.

Original information is encrypted according to the public key of the first user and the random value to obtain the encrypted information, and the encrypted information and the second proxy relationship are transmitted to a server.

In an embodiment of the present invention, this step includes:

selecting, by the first user, a symmetric key, and encrypting the original information according to the symmetric key to obtain an initial ciphertext; and encrypting the symmetric key according to the random value and the public key of the first user to obtain the encrypted key information, where the encrypted information includes the initial ciphertext and the encrypted key information.

In an embodiment of the present invention, the user A uses the individual public key $pk_A$ and the random value r to encrypt a message m to be sent to the user B to obtain a corresponding ciphertext c. The user A sends the ciphertext c to a server S together with the second proxy relationship $rk_{AB}^r$.

S24: Perform proxy transformation.

The server performs proxy transformation on the encrypted information according to the second proxy relationship to obtain the transformed information.

In an embodiment of the present invention, the server S uses the received second proxy relationship $rk_{AB}^r$ to perform proxy transformation on the ciphertext c.

S25: Transmit the transformed information.

The server transmits the transformed information to the target user.

In an embodiment of the present invention, this step further includes:

S26: Decrypt information.

The target user decrypts the transformed information according to the private key of the target user to obtain the original information.

In an embodiment of the present invention, the target user B decrypts the transformed information according to the $sk_B$ to obtain the message m.

In a communication method for performing proxy transformation according to an embodiment of the present invention, a data owner generates a proxy key and saves the key locally, and when sharing data, randomizes the proxy key and sends the randomized key to a proxy server; the proxy server uses the randomized key to complete proxy re-encryption; and a receiver decrypts information re-encrypted by using the randomized proxy key. Therefore, the security hazard that the server performs proxy transformation without user permission is eliminated, the security is enhanced, and the security of data transmission is effectively protected.

An implementation scenario of the communication method for performing proxy transformation according to an embodiment of the present invention is described in the following with reference to FIG. 3.

Figure 3:
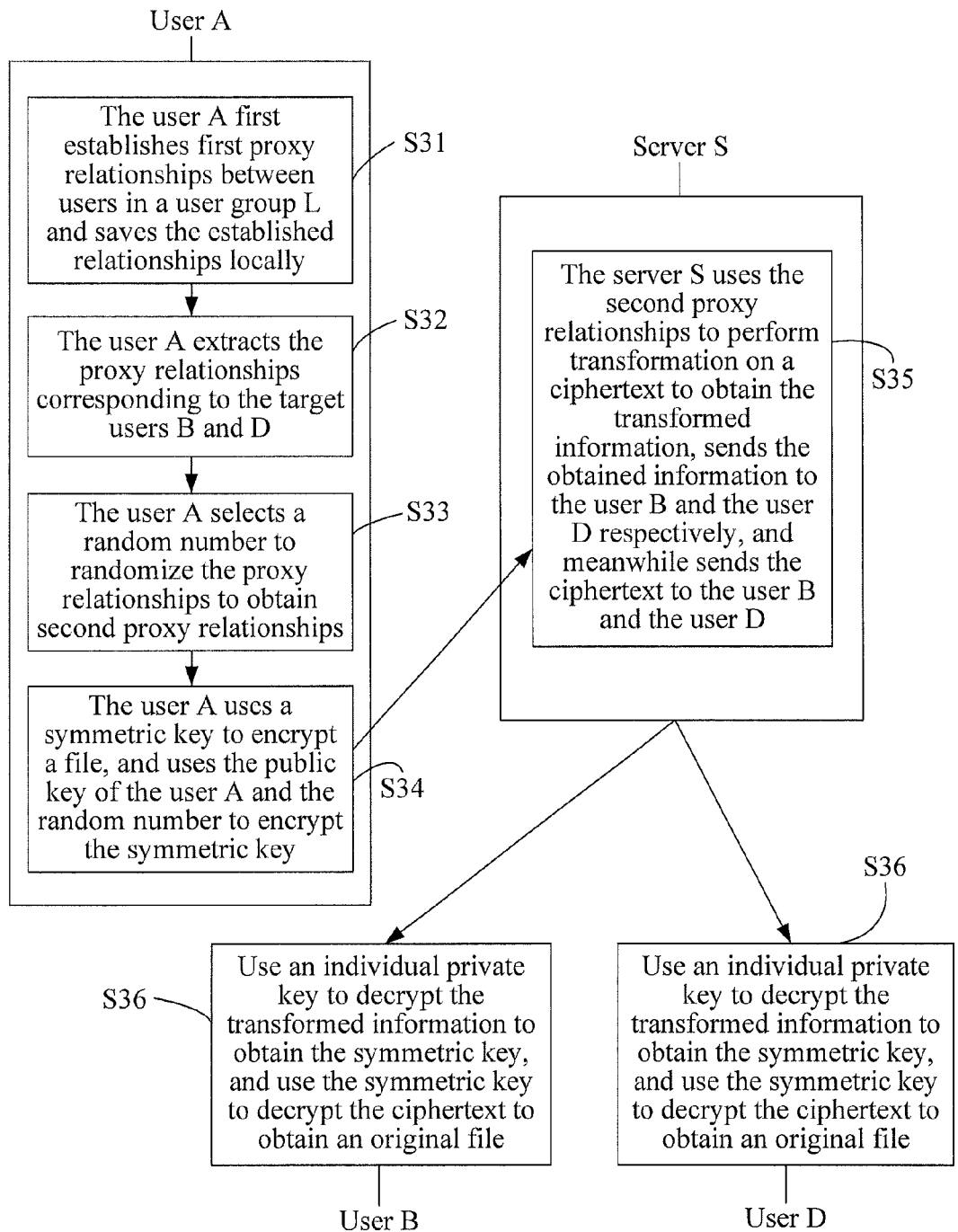
FIG. 3 is an implementation scenario of a communication method for performing proxy transformation between a user and a server according to an embodiment of the present invention.

As shown in FIG. 3, a user A has several files f1, f2, . . . , fn that need to be shared with a user group L (including a user B, . . . , user Z), where different files need to be shared with different users.

S31: The user A first establishes first proxy relationships $rk_{AB}$, . . . , $rk_{AZ}$ between the users in the user group L and saves the established relationships locally.

S32: The file f1 needs to be shared with the user B and the user D, and the user A extracts the proxy relationships $rk_{AB}$ and $rk_{AD}$ corresponding to the target users B and D.

S33: For this sharing, the user A selects a random number $r_1$ to randomize the proxy relationships $rk_{AB}$ and $rk_{AD}$ to obtain second proxy relationships $rk_{AB}^{r_1}$ and $rk_{AD}^{r_1}$.

S34: The user A selects a symmetric key $sk_{f_1}$, uses the $sk_{f_1}$ to encrypt the file f1 to obtain a ciphertext $c_{f_1}$ and uses the public key $pk_A$ of the user A and the random number $r_1$ to encrypt the $sk_{f_1}$ to obtain a ciphertext $$c_{sk_{f_1}},$$

and then sends the $c_{f_1}$, the $$c_{sk_{f_1}}$$

and the second proxy relationships $rk_{AB}^{r_1}$ and $rk_{AD}^{r_1}$ together to a server S.

S35: The server S uses the second proxy relationships $rk_{AB}^{r_1}$ and $rk_{AD}^{r_1}$ to perform transformation on the ciphertext $$c_{sk_{f_1}}$$

to obtain the transformed information $$c_{sk_{f_1}}^B$$

and $$c_{sk_{f_1}}^D,$$

sends the obtained information to the user B and the user D, respectively, and meanwhile sends the ciphertext $c_{f_1}$ to the user B and the user D.

S36: The user B and the user D use individual private keys to decrypt the $$c_{sk_{f_1}}^B$$

and $$c_{sk_{f_1}}^D,$$

respectively, to both obtain the $sk_{f_1}$ and use the $sk_{f_1}$ to decrypt the ciphertext $c_{f_1}$ to obtain the file f1 afterwards.

A mathematical description of specific solutions of the communication method for performing proxy transformation based on the embodiment of the present invention is given below.

First, a system public parameter and a PKG (Private Key Generator, private key generator) parameter are generated, including: selecting cyclic groups $G_1$ and $G_2$, selecting a generator g of 1 randomly from bilinear mapping $e:G_1 \times G_1 \rightarrow G_2$, and selecting a hash function $H_1:\{0,1\}^* H_2: G_2 \rightarrow G_1$.

a. The PKG selects an integer s randomly as an individual master key, and calculates and publishes $g^s$.

b. Generation of a secret value: each user A selects integers $x_A$ and t randomly as individual key values.

c. Generation of the public key: each user A calculates an individual public key $pk_A=(g^{sx_A}, g^t)$.

d. Generation of part of the private key: for each user A, the PKG calculates $g_A=H_1(id_A)$, and sends $g_A^s$ to the user A.

e. Generation of the private key: each user A calculates an individual private key $sk_A=g_A^{sx_A}$.

f. Use the public key to encrypt a message: use the public key of the user A to encrypt a message m, select two integers $r_1$ and $r_2$ randomly, and calculate a ciphertext $c'=(g^{tr_1r_2}, g^{r_1}, m \cdot e(g_A^{r_1}, g^{sx_A}))$, recorded as $CBE_A(m)=c_2$.

g. Generation of a proxy key: in order to calculate a proxy key from A to B, the user A selects an element x in $G_2$ randomly, calculates the proxy key $rk_{AB}=(g_A^{-gx_A} \cdot H_2^t(x), CBE_B(x))$, and uses a random number $r_2$ to randomize $rk_{AB}$ to obtain $rk_{AB}'=(g_A^{-sx_A} \cdot H_2^{tr_2}(x), CBE_B(x))$.

h. Re-encryption: use $rk_{AB}'$ to re-encrypt $c_1=(g^{tr},g^r,m\cdot(g_A\cdot g^{sx_A})^r)$, and calculate $c'm\cdot e(g_A^{r_1},g^{sx_A})\cdot e(g_A^{-sx_A}\cdot H_2^{tr_2}(x), g^{r_1})=m\cdot e(H_2^{tr_2}(x),g^{r_1})$ where the re-encrypted ciphertext is $c_3=(g^{tr},c',CBE_B(x))$.

i. Decryption: a receiver calculates $c_3\backslash e(H_2(x),g^{tr_1r_2})=m$.

In the communication method for performing proxy transformation according to an embodiment of the present invention, a data owner generates a proxy key and saves the key locally, and when sharing data, randomizes the proxy key and sends the randomized key to a proxy server; the proxy server uses the randomized key to complete proxy re-encryption; and a receiver decrypts information re-encrypted by using the randomized proxy key. Therefore, the security hazard that the server performs proxy transformation without user permission is eliminated, the security is enhanced, and the security of data transmission is effectively protected.

Figure 4:
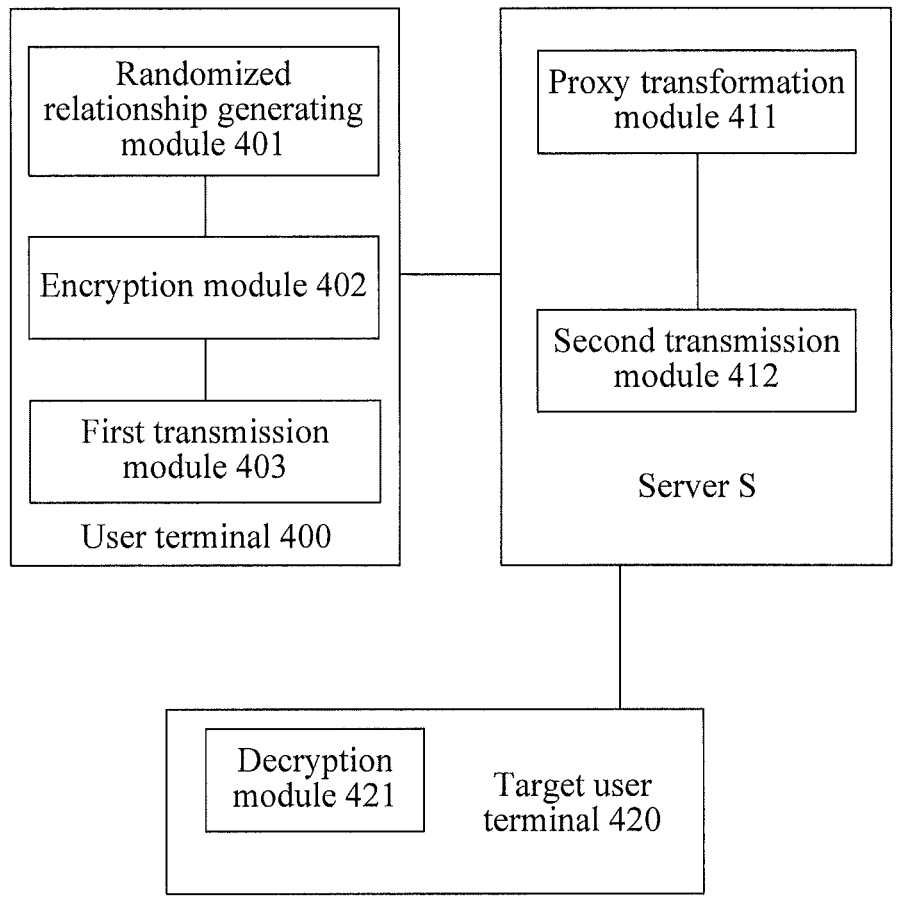
FIG. 4 is a structural diagram of a user terminal for performing proxy transformation between a user and a server according to an embodiment of the present invention.

As shown in FIG. 4, a user terminal 400 for performing proxy transformation according to an embodiment of the present invention includes a randomized relationship generating module 401, an encryption module 402 and a first transmission module 403.

The randomized relationship generating module 401 is configured to select a first proxy relationship corresponding to a target user terminal from a proxy relationship library, and generate a second proxy relationship according to a random value and the first proxy relationship. The encryption module 402 is configured to encrypt original information according to the random value obtained by the randomized relationship generating module 401 and the public key of the first user terminal to obtain the encrypted information. The first transmission module 403 is configured to transmit the encrypted information obtained by the encryption module 402 and the second proxy relationship obtained by the randomized relationship generating module 401.

In the user terminal 400 for performing proxy transformation according to an embodiment of the present invention, a data owner generates a proxy key and saves the key locally, and when sharing data, randomizes the proxy key and sends the randomized key to a proxy server; the proxy server uses the randomized key to complete proxy re-encryption; and a receiver decrypts information re-encrypted by using the randomized proxy key. Therefore, the security hazard that the server performs proxy transformation without user permission is eliminated, the security is enhanced, and the security of data transmission is effectively protected.

In an embodiment of the present invention, the proxy relationship is calculated according to the private key of the user terminal 400 and the public key of the target user terminal 420.

In an embodiment of the present invention, as shown in FIG. 4, the target user terminal 420 includes a decryption module 421, and the decryption module 421 decrypts the transformed information according to the private key of the target user terminal 420 to obtain the original information.

In an embodiment of the present invention, the encryption module 402 is configured to encrypt the original information according to the symmetric key to obtain an initial ciphertext; and encrypt the symmetric key according to the random value and the public key of the first user terminal to obtain the encrypted key information, where the encrypted information includes the initial ciphertext and the encrypted key information.

In the user terminal 400 for performing proxy transformation according to an embodiment of the present invention, a data owner generates a proxy key and saves the key locally, and when sharing data, randomizes the proxy key and sends the randomized key to a proxy server; the proxy server uses the randomized key to complete proxy re-encryption; and a receiver decrypts information re-encrypted by using the randomized proxy key. Therefore, the security hazard that the server performs proxy transformation without user permission is eliminated, the security is enhanced, and the security of data transmission is effectively protected.

Figure 5:
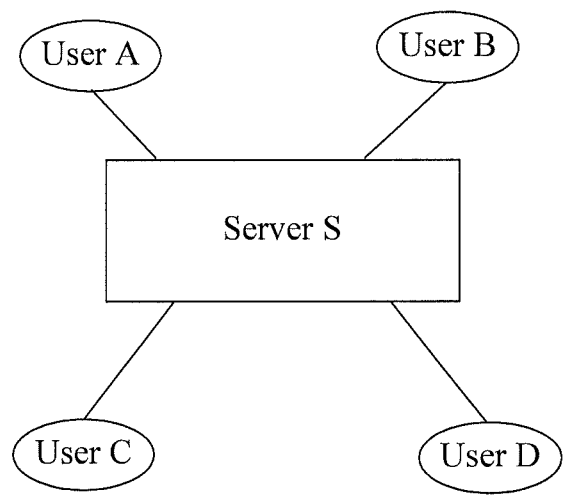
FIG. 5 is a schematic diagram of a communication system for performing proxy transformation between a user and a server according to an embodiment of the present invention.

As shown in FIG. 5, a communication system for performing proxy transformation according to an embodiment of the present invention includes:

at least one user terminal, configured to establish proxy relationships between the user terminal and other user terminals at a first user terminal, and generate a proxy relationship library according to the proxy relationships; and a server, where the first user terminal selects a proxy relationship between a target user terminal and the user terminal from the proxy relationship library, then selects a random value, and generates a randomized proxy relationship according to the random value and the corresponding proxy relationship;

the first user terminal encrypts original information according to the public key of the first user terminal and the random value to obtain the encrypted information, and transmits the encrypted information and the randomized proxy relationship to the server;

the server performs proxy transformation on the encrypted information according to the randomized proxy relationship to obtain the transformed information, and transmits the transformed information to the target user terminal; and the target user terminal decrypts the transformed information to obtain the original information.

In the system for performing proxy transformation according to an embodiment of the present invention, a data owner generates a proxy key and saves the key locally, and when sharing data, randomizes the proxy key and sends the randomized key to a proxy server; the proxy server uses the randomized key to complete proxy re-encryption; and a receiver decrypts information re-encrypted by using the randomized proxy key. Therefore, the security hazard that the server performs proxy transformation without user permission is eliminated, the security is enhanced, and the security of data transmission is effectively protected.

In an embodiment of the present invention, the decrypting, by the target user terminal, the transformed information to obtain the original information includes: decrypting, by the target user, the transformed information according to the private key of the target user to obtain the original information.

As shown in FIG. 4, in an embodiment of the present invention, the server S includes a proxy transformation module 411 and a second transmission module 412. The proxy transformation module 411 is configured to, according to the received second proxy relationship transmitted by the first transmission module 403, perform proxy transformation on the encrypted information to obtain the transformed information. The second transmission module 412 is configured to transmit the transformed information obtained by the proxy transformation module 411 to the target user terminal 420.

In the system for performing proxy transformation according to an embodiment of the present invention, a data owner generates a proxy key and saves the key locally, and when sharing data, randomizes the proxy key and sends the randomized key to a proxy server; the proxy server uses the randomized key to complete proxy re-encryption; and a receiver decrypts information re-encrypted by using the randomized proxy key. Therefore, the security hazard that the server performs proxy transformation without user permission is eliminated, the security is enhanced, and the security of data transmission is effectively protected.

It may be clearly understood by persons skilled in the art that, for the purpose of convenient and brief description, for a detailed working process of the foregoing system, apparatus, and unit, reference may be made to a corresponding process in the method embodiments, and details are not described herein again.

In the embodiments provided in the present application, it should be understood that the disclosed system, apparatus, and method may be implemented in other modes. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

In addition, functional units in the embodiments of the present invention may be integrated into a processing unit, or each of the units may exist alone physically, or two or more units are integrated into a unit.

When the functions are implemented in the form of a software functional unit and sold or used as a separate product, the functions may be stored in a computer-readable storage medium. Based on such an understanding, the technical solutions of the present invention essentially, or the part contributing to the prior art, or part of the technical solutions may be implemented in the form of a software product. The computer software product is stored in a storage medium, and includes several instructions for instructing a computer device (which may be a personal computer, a server, a network device, and the like) to perform all or part of the steps of the method described in the embodiment of the present invention. The storage medium includes: any medium that can store program codes, such as a USB flash disk, a removable hard disk, a read-only memory (ROM, Read-Only Memory), a random access memory (RAM, Random Access Memory), a magnetic disk, or an optical disk.

The foregoing descriptions are merely exemplary specific embodiments of the present invention, but are not intended to limit the protection scope of the present invention. Any variation or replacement figured out by persons skilled in the art within the technical scope disclosed in the present invention shall fall within the protection scope of the present invention. Therefore, the protection scope of the present invention shall be subject to the protection scope claimed by the claims.

What is claimed is:

1. A method for performing proxy transformation, comprising:
   selecting a first proxy relationship between a target user and a first user from a proxy relationship library;
   selecting a random value, and generating a second proxy relationship according to the random value and the first proxy relationship; and
   encrypting original information according to a public key of the first user and the random value to obtain encrypted information, and transmitting the encrypted information and the second proxy relationship to a server, so that the server performs proxy transformation on the encrypted information according to the second proxy relationship to obtain transformed information.

2. The method for performing proxy transformation according to claim 1, wherein the first proxy relationship is calculated according to the private key of the first user and the public key of the target user.

3. The method for performing proxy transformation according to claim 1, wherein the proxy relationship library is saved at the first user.

4. The method for performing proxy transformation according to claim 1, wherein the encrypting the original information according to the public key of the first user and the random value to obtain the encrypted information comprises:
   selecting, by the first user, a symmetric key, and encrypting the original information according to the symmetric key to obtain an initial ciphertext; and
   encrypting the symmetric key according to the random value and the public key of the first user to obtain encrypted key information, where
   the encrypted information comprises the initial ciphertext and the encrypted key information.

5. The method for performing proxy transformation according to claim 1, wherein after the server performs proxy transformation on the encrypted information according to the second proxy relationship to obtain the transformed information, the method further comprises:
   transmitting, by the server, the transformed information to the target user.

6. The method for performing proxy transformation according to claim 5, wherein after the transmitting, by the server, the transformed information to the target user, the method further comprises:
   decrypting, by the target user, the transformed information according to the private key of the target user to obtain the original information.

7. A user terminal for performing proxy transformation, comprising:
   a memory; and
   a processor coupled to the memory and configured to:
      select a first proxy relationship between the user terminal and a target user terminal from a proxy relationship library, and generate a second proxy relationship according to a random value and the first proxy relationship;
      encrypt original information to obtain encrypted information according to the random value and a public key of a first user terminal; and
      transmit the encrypted information and the second proxy relationship.

8. The user terminal according to claim 7, wherein the processor is further configured to:
   select, by the user terminal, a symmetric key, and encrypt the original information according to the symmetric key to obtain an initial ciphertext; and
   encrypt the symmetric key according to the random value and the public key of the first user terminal to obtain encrypted key information, wherein
   the encrypted information comprises the initial ciphertext and the encrypted key information.

9. A system for performing proxy transformation, comprising:
   at least one user terminal, configured to establish proxy relationships between the user terminal and other user terminals at a first user terminal, and generate a proxy relationship library according to the proxy relationships; and a server, wherein the first user terminal is configured to select a first proxy relationship between a target user terminal and the first user terminal from the proxy relationship library, then select a random value, and generate a second proxy relationship according to the random value and the first proxy relationship;

the first user terminal is configured to encrypt original information according to a public key of the first user terminal and the random value to obtain encrypted information, and transmit the encrypted information and the second proxy relationship to the server;

the server is configured to perform proxy transformation on the encrypted information according to the second proxy relationship to obtain transformed information, and transmit the transformed information to the target user terminal; and the target user terminal is configured to decrypt the transformed information to obtain the original information.

10. An apparatus comprising a user terminal for performing proxy transformation configured to select a first proxy relationship between the user terminal and a target user terminal from a proxy relationship library, and generate a second proxy relationship according to a random value and the first proxy relationship, configured to, according to the random value and a public key of a first user terminal, encrypt original information to obtain encrypted information, and configured to transmit the encrypted information and the second proxy relationship.

* * * * *